United States Patent [19]

Scull

[11] 4,062,047

[45] Dec. 6, 1977

[54] APPARATUS FOR MAGNETIC TAPE HEAD ALIGNMENT

[75] Inventor: Harvey Ronald Scull, Wheaton, Ill.

[73] Assignee: Bell Telephone Laboratories, Incorporated, Murray Hill, N.J.

[21] Appl. No.: 719,586

[22] Filed: Sept. 1, 1976

[51] Int. Cl.² .............................................. G11B 5/02
[52] U.S. Cl. ..................................................... 360/26
[58] Field of Search ...................... 360/26, 27, 22, 31, 360/76

[56] References Cited

U.S. PATENT DOCUMENTS

| | | | |
|---|---|---|---|
| 3,414,816 | 12/1968 | Tobey et al. | 360/76 |
| 3,812,531 | 5/1974 | Hall | 360/26 |
| 3,845,500 | 10/1974 | Hart | 360/76 |
| 3,877,069 | 4/1975 | Altonji et al. | 360/26 |
| 3,900,888 | 8/1975 | Uchikoshi et al. | 360/76 |

*Primary Examiner*—Vincent P. Canney
*Attorney, Agent, or Firm*—John C. Albrecht; Peter Visserman

[57] ABSTRACT

A test set is disclosed for measuring read/write head skew in a magnetic tape recording system. Read head skew is measured by reading a reference tape having substantially identical alternating signals recorded in all tracks thereof and measuring the time between the receipt of signal peaks of corresponding portions of the signals read from any two tracks of the reference tape. Pulses from a high frequency oscillator are counted during the time between the signal peaks to obtain counts which are representative of the read head skew. These counts are averaged over a number of cycles of the alternating signals and displayed on a digital display. Write head skew is measured by writing an alternating signal onto two tracks of a magnetic tape and reading the two tracks with a properly aligned read head. Maximum head skew is determined and displayed by comparing the contents of a display register to the present count and transferring the present count into the display register if the present count is greater or equal to the contents of the display register.

20 Claims, 7 Drawing Figures

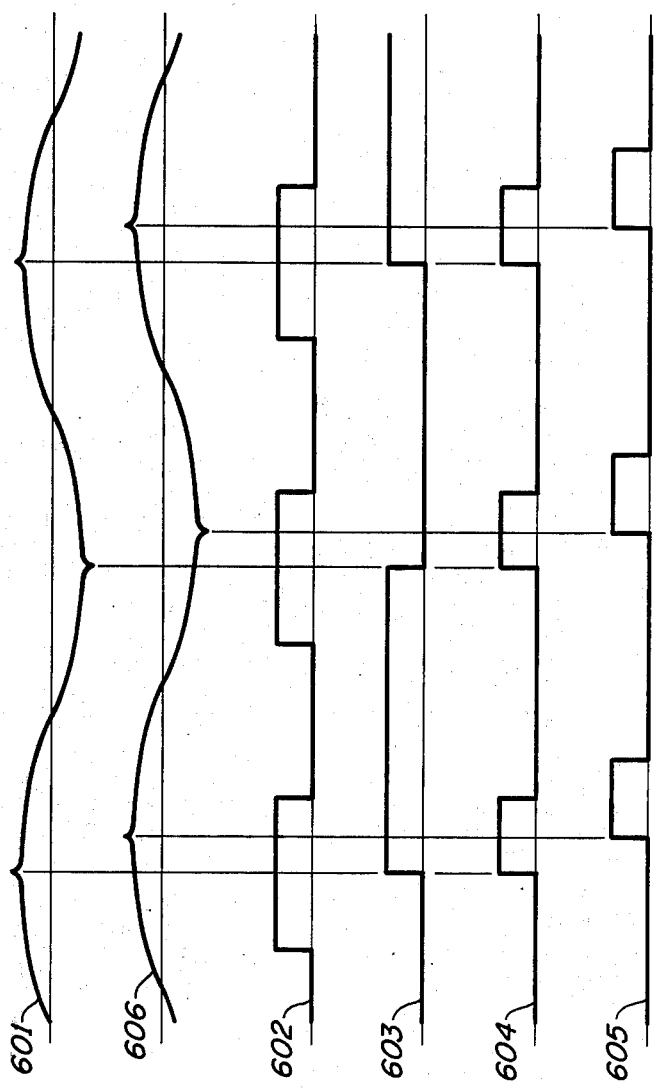

APPARATUS FOR MAGNETIC TAPE HEAD ALIGNMENT

FIELD OF THE INVENTION

My invention relates to measuring read/write head skew in magnetic recording systems and more particularly to measuring read/write head skew in a multiple track magnetic tape recording system.

BACKGROUND OF THE INVENTION

In many magnetic tape recording applications, e.g., in computer data storage, several parallel signal tracks are simultaneously recorded or read from a magnetic tape by moving the tape past a tape head. Generally the tracks must be synchronized since the desired signal is comprised of information from each of the tracks. To ensure synchronization, the tape heads in such multiple track magnetic tape recording systems must have a fixed orientation relative to the tape. The standard orientation maintains the tape heads at a ninety degree angle relative to the tape edge. This orientation is known as the azimuth. The read head azimuth or alignment is measured by playing a standard alignment tape which has an alternating signal recorded on at least two tracks thereof. This standard alignment tape is carefully recorded to ensure that the signals in the various tracks are synchronized when the read head is properly aligned. Thus, the time between corresponding portions of the signals read from two tracks is representative of read head misalignment or skew. The signals read from two tracks of the standard alignment tape are viewed on an oscilloscope to check the synchronization of the signals. Since the waveforms displayed on the oscilloscope are highly unstable and jittery, a skilled operator is required to interpret the waveforms and to utilize them to properly align the read head.

Write head skew is measured by recording an alternating signal on at least two tracks of a magnetic tape and reading the tracks with a properly aligned read head. The write head is aligned by adjusting the write head until the signals read are in synchronism.

SUMMARY OF THE INVENTION

In accordance with my invention, a test set for measuring tape head skew in a multiple track magnetic tape recording system measures the time period between the occurrence of corresponding peaks of signals read from two tracks of a magnetic tape by counting pulses from a high frequency oscillator during the time period. The repetition period of the signal from the oscillator is short in comparison to an allowable skew period, and; accordingly, several pulses are counted even for small amounts of skew. The counts, which are representative of tape head skew, are displayed to allow an operator to align the tape heads. An operator aligns a tape head by adjusting the tape head until the display reads as near to zero as possible.

The counts are averaged over a selectable number of cycles of the signals read from the magnetic tape to obtain average skew indications and to stablize the display. Maximum tape head skew can also be measured by comparing each count with the contents of a register and placing the larger of the two in the register. The maximum skew encountered is displayed by displaying the register contents.

Both read head and write head skew are measured by one embodiment of my invention. Read head skew is measured by reading a prerecorded reference tape. Write head skew is measured by providing a periodic signal to two write head driver circuits which selectively drive two write gaps of a write head of the multiple track magnetic tape recording system. These signals are written onto a magnetic tape and read by a properly aligned read head. The skew display, which is derived from the signals read by the properly aligned read head, is indicative of the skew of the write head.

In one specific embodiment of my invention, a test set comprises two signal processor circuits which generate signals indicative of the level and the positive and negative peaks of output signals read from two selected tracks of a magnetic tape. Pulses from a high frequency oscillator are gated to a counter circuit under the control of circuitry responsive to the signals generated by the signal processor circuits. Circuitry is provided for displaying the counts accumulated in the counter circuit.

BRIEF DESCRIPTION OF THE DRAWING

The invention will be understood from the following detailed description when read with reference to the drawing in which:

FIG. 6 is a diagram of various signals utilized to describe circuit operations; and FIG. 7 is a diagram showing the interconnection of FIGS. 2 through 5.

DETAILED DESCRIPTION

Figure 1:
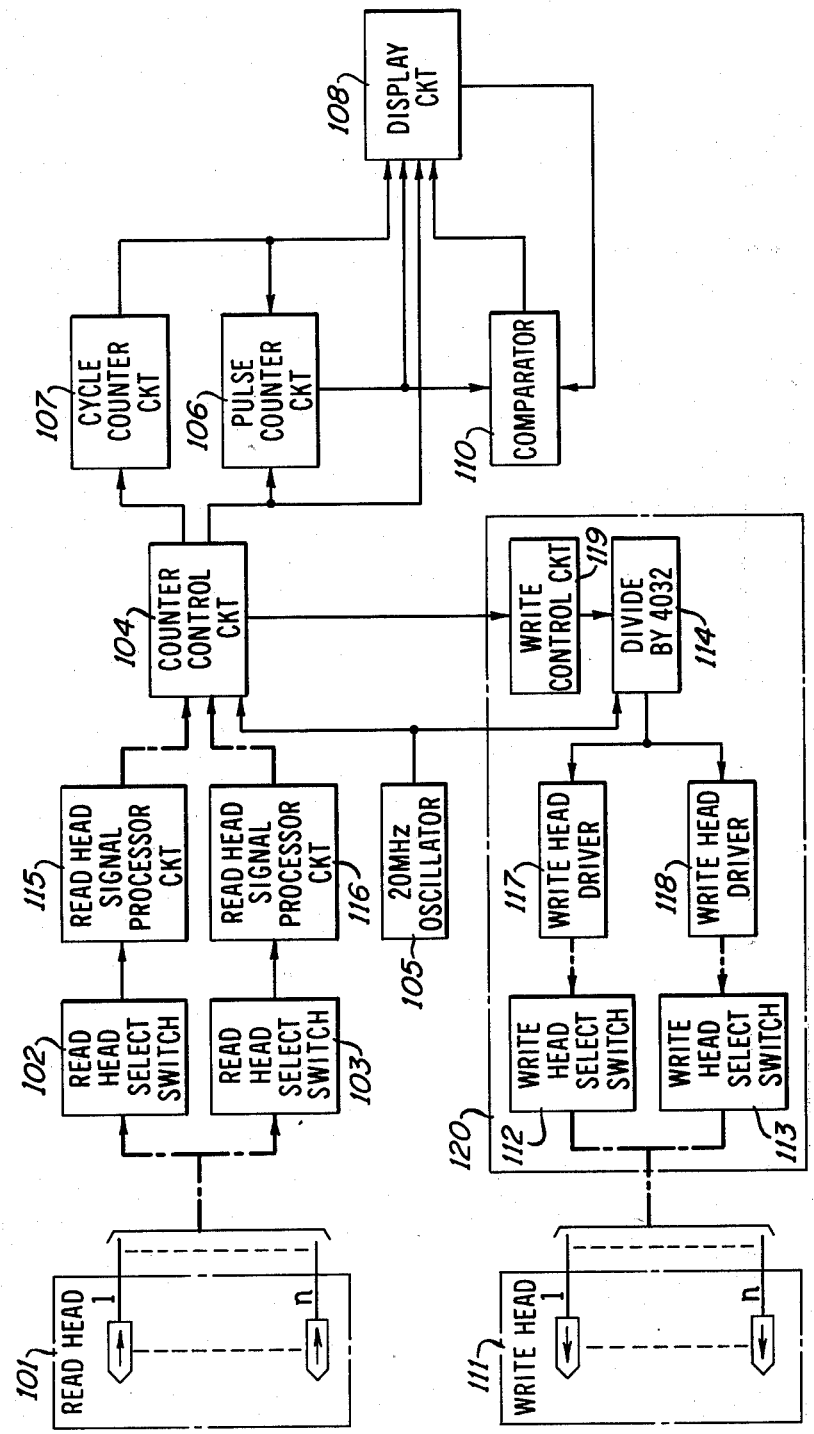
FIG. 1 is a block diagram of my tape head alignment test set.

FIG. 1 is a block diagram of a tape head skew alignment test set in accordance with my invention. The test set performs average and maximum skew measurements on both the read and write heads of a multiple track magnetic tape recording system. For read head alignment, a standard alignment tape is read by the read head 101. The standard alignment tape has substantially identical signals recorded in all tracks thereof such that when any two tracks are read by a properly aligned read head, the signals read are synchronized. The read head 101 is a part of the multiple track tape recording system to be tested and comprises head gaps 1 through $n$ which correspond to tape tracks 1 through $n$. The read head select switches 102 and 103 serve to connect the read head signal processor circuits 115 and 116 to any one of the read head 101 gaps 1 through $n$. The read head signal processor circuits 115 and 116 are identical to each other and each provides two output signals (see FIG. 6): the threshold signal 602 indicates whether the absolute value of the read head signal 601 has exceeded a predetermined value, and the peak signal 603 indicates when the read head signal 601 reaches positive and negative peaks. The threshold signal 602 is high if the absolute value of the read head signal 601 exceeds the predetermined value and is low otherwise; and the peak signal 603 goes high coincident with the positive peaks of the read head signal 601 and goes low coincident with the negative peaks of the read head signal 601. A threshold level of approximately 70 percent of the peak value of the read head signal 601 has been found to protect against noise spikes which might otherwise be interpreted as signal peaks.

A read head signal processor circuit can be constructed of any appropriate circuitry; however, it is convenient to utilize Motorola Preamplifier XC3467 and Motorola Read Amplifier MC3468 in accordance with Motorola provided data and application notes.

The threshold signal 602 and the peak signal 603 from both read head signal processor circuits 115 and 116 are processed by the counter control circuit 104 to enable gating circuitry within the counter control circuit 104. The gating circuitry is controlled to gate pulses from the 20 Mhz oscillator 105 to the pulse counter circuit 106 during the time between the occurrence of peaks of the signals read from two tracks, as described hereinafter. These counts are representative of the time between the receipt of these signals and accordingly tape head skew.

The display circuit 108 comprises counter circuitry, register circuitry, and digital display circuitry. The display circuit 108 can be constructed of any appropriate circuitry; however, the Texas Instruments TIL306 includes the required combination of circuitry in a single package and is utilized in the illustrative embodiment of the present invention.

The pulse counter circuit 106 provides division selectively by either 1,000 or 10,000 such that the pulses delivered to the counter circuitry of the display circuit 108 when counted over the selected number of cycles will be the average of the skew counts over that number of cycles. For average skew measurements, the cycle counter circuit 107 counts cycles of the signals read by the read head 101 to allow an averaging of a predetermined number of the counts taken between peaks of corresponding portions of the signals read by the read head 101. The cycle counter circuit 107 provides an output pulse upon selectively counting either 1,000 or 10,000 cycles to transfer the count from the counter circuitry of the display circuit 108 into the register circuitry of the display circuit 108 to digitally display the contents of the counter circuitry. The counter circuits are then cleared in preparation for the next counting period.

For maximum skew measurements, the pulse counter circuit 106 and the counter circuitry of the display circuit 108 count in parallel and; accordingly, both contain the same count. After each cycle of the signals read by the read head 101, the contents of the pulse counter circuit 106 are compared to the contents of the register circuitry of the display circuit 108. If the contents of the pulse counter circuit 106 are greater than the contents of the register circuitry of the display circuit 108, the contents of the counter circuitry of the display circuit 108 are transferred into the register circuitry of the display circuit 108. The duplicate count, comparison, and transfer arrangement are required since the contents of the counter circuitry of the display circuit 108 are not available externally.

The write circuitry 120 is required for write head skew measurements. The write head 111 is part of the multiple track magnetic tape recording system and comprises head gaps 1 through n which correspond to tape tracks 1 through n. The write head select switches 112 and 113 selectively connect the write head driver circuits 117 and 118 to any one of the write head 111 gaps 1 through n. The 20 Mhz signal from the 20 Mhz oscillator 105 is divided by 4,032 by the divider circuit 114 to provide a 4,960 hz signal to the write head select switch 113. The 4,960 hz signal corresponds to 200 bits per inch at a tape speed of 24.8 inches per second. This signal is written onto two selected tracks of a magnetic tape by the write head 111 and read by the read head 101, which must be in proper alignment. The write head 111 is adjusted to be within its skew tolerance by utilizing the read head 101 skew indications displayed by the display circuit 108. Writing is controlled by the write control circuit 119 as described hereinafter to help protect the standard alignment tape from inadvertent overwrite and to protect the write head 111 from double write currents.

Figure 2:
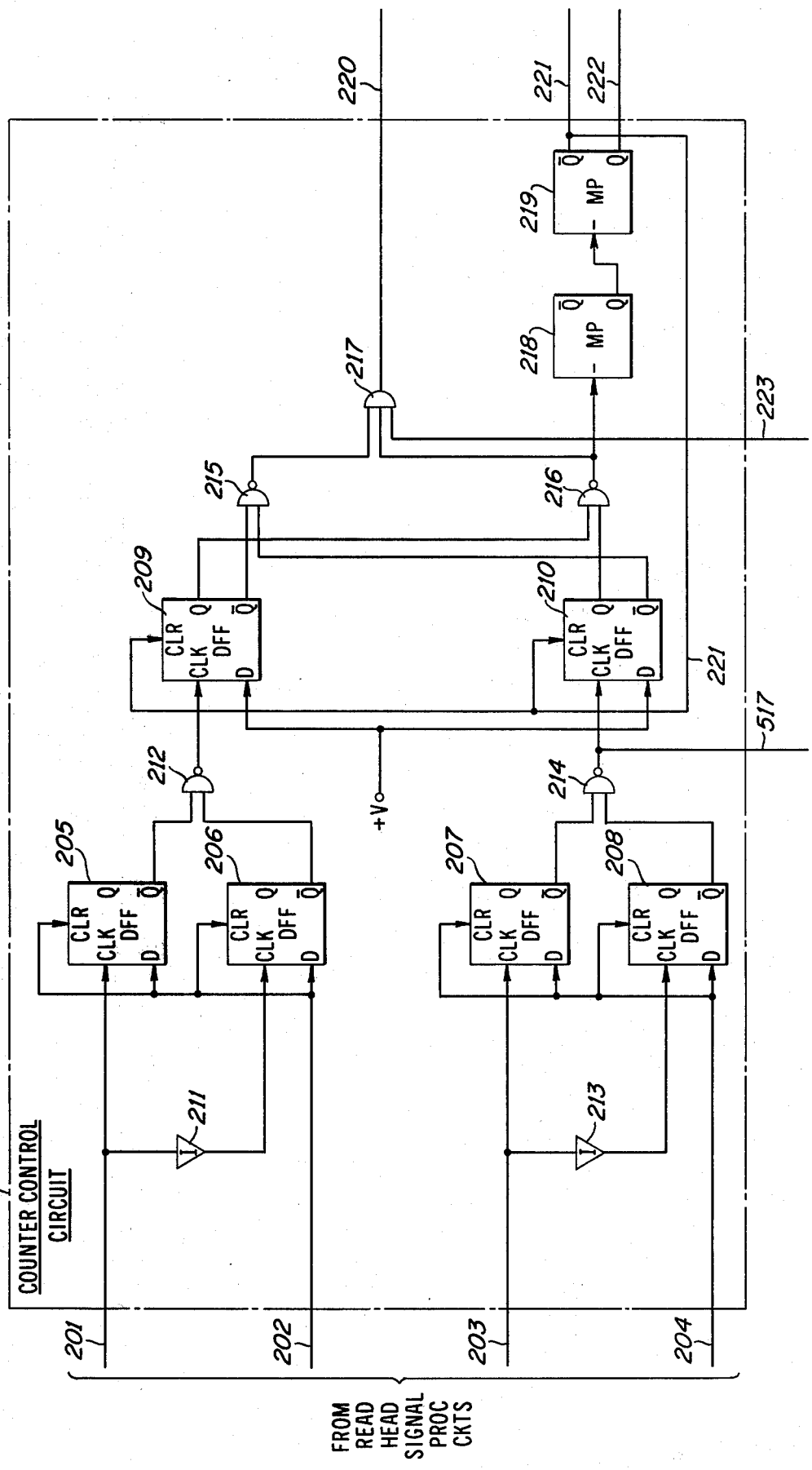
FIG. 2 is a schematic diagram of the counter control circuit of FIG. 1.

FIG. 2 shows a schematic diagram of the counter control circuit 104 of FIG. 1. The peak signal 603 and the threshold signal 602 from the read head signal processor circuit 115, generated in response to the read head signal 601, are respectively provided to leads 201 and 202. The D flip-flops 205 through 210 are commonly used D-type edge-triggered flip-flops featuring direct clear inputs and complementary Q and $\overline{Q}$ outputs. Input information from the data input D is transferred to the outputs on the positive edge of clock pulses provided to the clock (CLK) input. The D flip-flops 209 and 210 are initially cleared.

The peak signal 603 from the read head signal processor circuit 115 is provided directly to the clock input of the D flip-flop 205 and inverted by the inverter 211 and provided to the clock input of the D flip-flop 206. The threshold signal 602 is connected to the clear inputs and the data inputs of the D flip-flops 205 and 206 via the lead 202. Since the threshold signal 602 is initially low, the flip-flops 205 and 206 are cleared and the $\overline{Q}$ output signals of both flip-flops are high and accordingly the output signal of the NAND gate 212 is low. Progressing in time, the threshold signal 602 goes high removing the clear input signal and providing a high signal to the data inputs of the flip-flops 205 and 206. Peak signal 603 next goes high setting the flip-flop 205. It is noted that the peak signal 603 is inverted by the inverter 211 so the flip-flop 206 remains cleared. With flip-flop 205 set, its $\overline{Q}$ output signal is low and accordingly the output signal of the NAND gate 212 goes high. Next, the threshold signal 602 goes low clearing both the flip-flops 205 and 206 and forcing the output signal of the NAND gate 212 to go low. The threshold signal 602 once more goes high removing the clear signal and placing a high signal on the data input leads of the flip-flops 205 and 206. The peak signal 603 next goes low, which has no effect on the flip-flop 205, but due to the inversion by the inverter 211 the flip-flop 206 is set causing its $\overline{Q}$ output signal to go low forcing the output signal of the NAND gate 212 to go high. The threshold signal 602 once more goes low clearing the flip-flops 205 and 206 and forcing the output signal of the NAND gate 212 to go low. Thus, the output signal 604 of the NAND gate 212 is a series of pulses which go high coincident with the peaks of the read head signal 601 provided to the read head signal processor circuit 115 and go low coincident with the trailing edge of the threshold signal 602. The signals from the read head signal processor circuit 116, generated in response to the read head signal 606, are similarly processed by the flip-flops 207 and 208, the inverter 213, and the NAND gate 214, such that the output signal 605 of the NAND gate 214 is a series of pulses which go high coincident with the peaks of the read head signal 606 provided to the read head signal processor circuit 116 and go low coincident with the trailing edge of the threshold signal from the read head signal processor circuit 116.

The output signals from the NAND gates 212 and 214 respectively, drive the flip-flops 209 and 210. With both the flip-flops 209 and 210 cleared, the output signal of the NAND gate 215 is low and the output signal of the NAND gate 216 is high. The low output signal from the NAND gate 215 prevents pulses coming from the 20 Mhz oscillator 105 via the lead 223 from passing through the AND gate 217. One of the flip-flops 209 or 210 is set upon the arrival of the first peak of a corresponding pair of signal peaks forcing the output signal of the NAND gate 215 high to enable pulses from the 20 Mhz oscillator 105 to pass through the AND gate 217. The second of the flip-flops 209 and 210 is set upon the arrival of the second peak of the corresponding pair of signal peaks forcing the output signal of the NAND gate 216 low, preventing any further flow of pulses through the AND gate 217. The high-to-low transition of the output signal of the NAND gate 216 triggers the monopulser 218 which provides a delay before triggering the monopulser 219 which then provides a momentary low output signal on the $\overline{Q}$ output to clear the flip-flops 209 and 210 via the lead 221 in preparation for the next cycle of the input signal from the read head 101.

As an example of the operation of the counter control circuit 104 shown in FIG. 2, assume that the read head signal processor circuit 115 is connected to read head 101 gap 1, via the read head select switch 102 and that the read head signal processor circuit 116 is connected to the read head 101 gap n through the read head select switch 103. If the read head 101 is properly aligned, the signals read from track 1 of the tape by gap 1 of the read head 101 would be perfectly synchronized with the signals read from track n by the gap n of the read head 101 and no pulses would be gated through the AND gate 217. If, however, the read head 101 is skewed such that the signals recorded on track 1 appear earlier in time than the corresponding portion of the signals recorded on track n (as indicated by signals 601 and 606 and resulting signals 604 and 605), the output signal of the NAND gate 212 will have a low-to-high transition prior to the output signal of the NAND gate 214. The flip-flop 209 will be set to enable pulses from the 20 Mhz oscillator 105 to pass through the AND gate 217 until the flip-flop 210 is set which disables the flow of pulses. Thus, pulses will be gated through the AND gate 217 during the time between the occurrence of a peak of the signal on track 1 and a corresponding peak of the signal on track n. This time is indicative of the read head skew. The flip-flops 209 and 210 will be cleared by the signal from the monopulser 219 in response to the high-to-low transition of the output signal of the NAND gate 216. The D type flip-flops utilized for the flip-flops 209 and 210 are constructed such that the $\overline{Q}$ output signal changes before the Q output signal which ensures that the AND gate 217 will not be falsely enabled during the clearing procedure.

Figure 3:
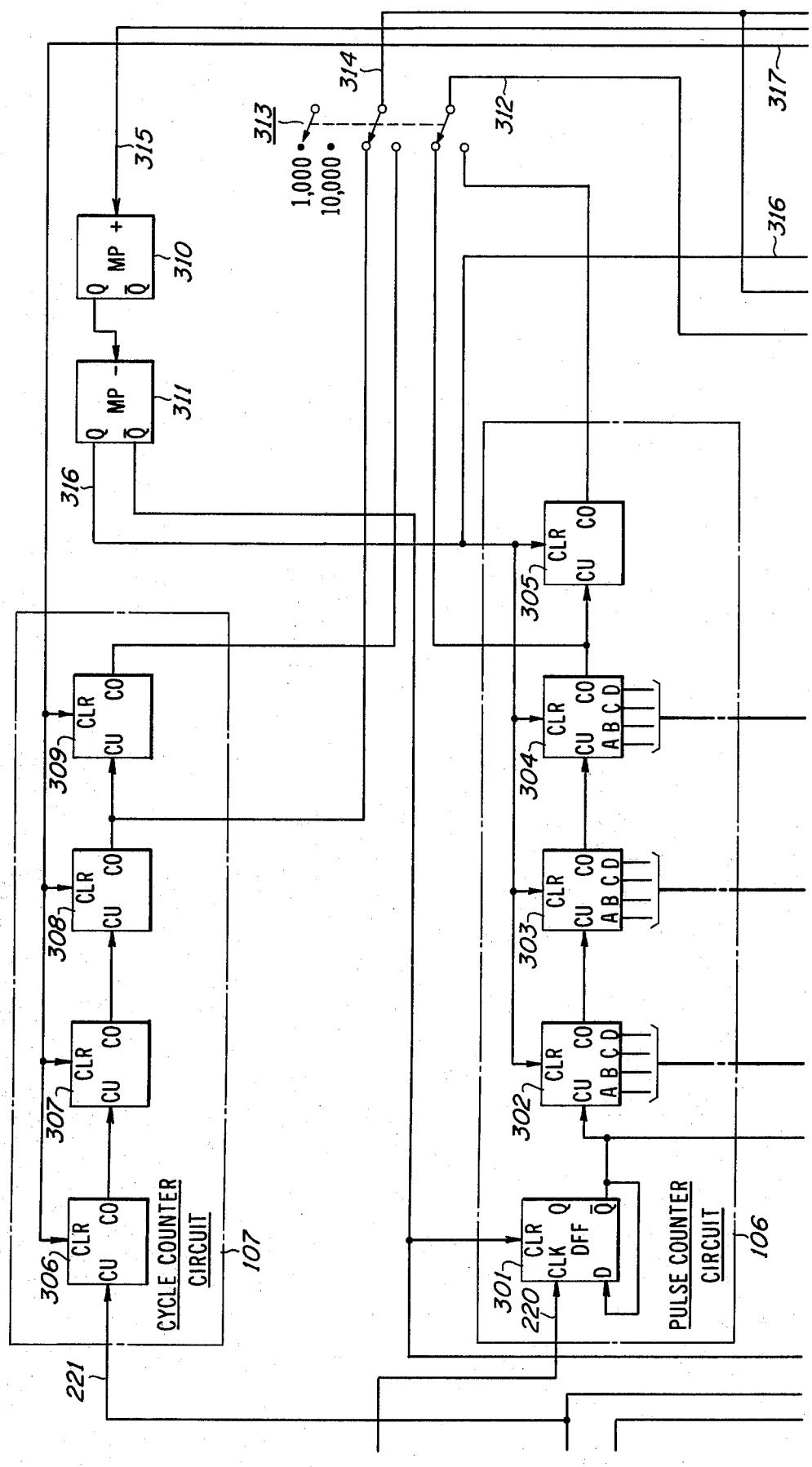
FIG. 3 is a schematic diagram of the cycle counter circuit and the pulse counter circuit, both of FIG. 1.

FIG. 3 is a schematic diagram of the pulse counter circuit 106 and the cycle counter circuit 107. The 20 Mhz pulses gated through the AND gate 217 are transmitted to the pulse counter circuit 106 via the lead 220. The pulse counter circuit 106 is comprised of the D flip-flop 301 and the decade counters 302 through 305. The sequence of 20 Mhz pulses is initially divided by two by the D flip-flop 301 to provide a signal having a repetition period of 100 nanoseconds or one tenth of a microsecond which is convenient to display on the digital display circuitry of the display circuit 108. The decade counters 302 through 305 each serve to further divide the pulse sequence by 10 respectively. Thus, by setting the switch 313 to select either the output signal from the decade counter 304 or the output signal from the decade counter 305, a division by 1,000 or 10,000 respectively can be effected. This division is necessary to average the skew counts over 1,000 or 10,000 cycles of the signal read by the read head 101.

The cycle counter circuit 107 comprises the decade counters 306 through 309. Negative pulses from the $\overline{Q}$ output of the monopulser 219 are delivered to the cycle counter circuit 107 via the lead 221. Each of these pulses corresponds to a cycle of the signal read by the read head 101. For average skew measurements, the cycle counter circuit 107 provides an output pulse to the monopulser 310 via the leads 314 and 315 and the switch 405 after 1,000 or 10,000 cycles dependent upon the position of the switch 313. The monopulser 310 provides a delay before triggering the monopulser 311 which provides output pulses to clear the decade counters 302 through 309, the D flip-flop 301, and the counter circuitry of the display circuit 108. The output pulse from the cycle counter circuit 107 also serves to transfer and latch the contents of the counting circuitry of the display circuit 108 into the register circuitry of the display circuit 108 via the leads 314 and 409 and the switch 405. The average over 1,000 cycles is utilized when tweaking the alignment of the tape heads and the average over 10,000 cycles is utilized to maintain a stable display on the digital display circuitry of the display circuit 108. The average periods are selected by positioning the switch 313 to the desired period.

Figure 4:
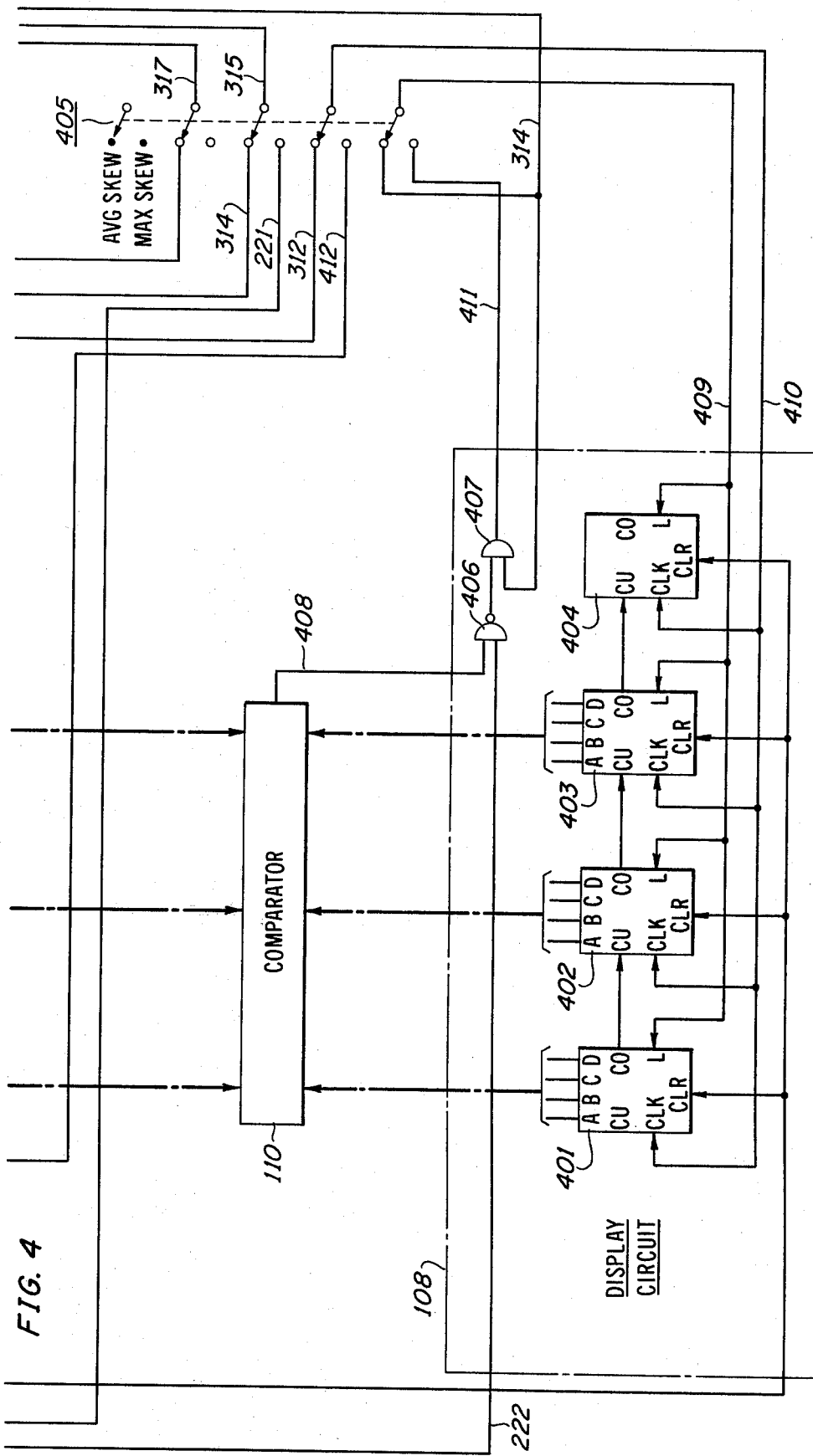
FIG. 4 is a schematic diagram of the digital display circuit and the comparator circuit, both of FIG. 1.

FIG. 4 is a schematic diagram of the display circuit 108 and the comparator circuit 110. The comparator circuit 110 is necessary for a maximum skew measurement only and will be described hereinafter. The display circuit 108 comprises four Texas Instruments TIL306 numeric display circuits 401 through 404. Each of the numeric display circuits 401 through 404 comprises counter circuitry, register circuitry, decoder/driver circuitry, and a seven-segment LED display. For an average skew measurement (the switch 405 being set to avg skew), the counting circuitry of the display circuit 108 counts the pulses which are delivered by the pulse counter circuit 106 via the leads 312 and 410 and the switch 405. As discussed above, the 20 Mhz pulses gated through the AND gate 217 and delivered to the pulse counter circuit 106 are initially divided by two such that each output pulse represents one tenth of a microsecond of head skew. The pulses are then divided by 1,000 or 10,000 by the decade counters 302 through 305 dependent upon the position of the switch 313 to allow an averaging over the selected number of cycles.

The counts accumulated in the counter circuitry of the display circuit 108 after the selected number of cycles (1,000 or 10,000) is representative of the average skew encountered over the selected number of cycles of the input signal. After the selected number of cycles have been counted, the cycle counter circuit 107 provides a latch signal via the leads 314 and 409 to transfer the count in the counter circuitry of the display circuit 108 into the register circuitry of the display circuit 108 and then via the monopulsers 310 and 311 clears the cycle counter circuit 107, the pulse counter circuit 106, and the counter circuitry of the display circuit 108 in preparation for the next sequence of cycles of the input signal.

For a maximum skew measurement the switch 405 is set to the max skew position which: (1) connects the Q output signal of the monopulser 219 to the monopulser 310 via the leads 221 and 315 [to provide a clear signal after each cycle of the signal from the read head 101]; (2) connects the input of the decade counter 302 in parallel with the input of the counter circuitry of the display circuit 108 via the leads 410 and 412 such that both counters count the same signal; (3) disconnects the clear signal provided to the decade counters 306 through 309 via the leads 316 and 317; and (4) connects the output of the AND gate 407 to the latch inputs of the numeric displays 401 through 404 via the leads 409 and 411. The AND gate 407 provides a latch signal to the numeric displays 401 through 404 in response to a signal from the cycle counter circuit 107 via the lead 314 and in response to a signal from the NAND gate 406 which is connected to the comparator circuit 110 via the lead 408 and to the Q output of the monopulser 219 via the lead 222. The decade counters 302 through 304 and the counter circuitry of the display circuit 108 both count the pulses from the D flip-flop 301 during the time between the peaks of corresponding portions of the signals read by the read head 101 from two tracks of a magnetic tape as previously discussed. This duplicated counting is necessary since the outputs of the counter circuitry of the display circuit 108 are not available externally.

As each cycle count accumulates, the contents of the decade counters 302 through 304 are compared to the contents of the register circuitry of the display circuit 108 by the comparator circuit 110. If the contents of the decade counter 302 through 304 are greater than or equal to the contents of the register circuitry, a positive signal will be provided on the lead 408 by the comparator 110. The end of each cycle of the signal read by the read head 101 is indicated by monopulser 219 which provides a positive pulse to the NAND gate 406 via the lead 222. If the signal on the lead 408 is positive, indicating that the present count contained in the decade counters 302 through 304 (and also contained in the counter circuitry of the display circuit 108) is greater than or equal to the contents of the register circuitry of the display circuit 108, then the positive pulse on the lead 222 will generate a negative pulse on the output of the NAND gate 406. The negative pulse is passed through the AND gate 407 to the latch inputs of the numeric displays 401 through 404. This latch signal transfers the contents of the counter circuitry of the display circuit 108 into the register circuitry of the display circuit 108.

The decade counters 306 through 309 are not cleared during maximum skew measurements. Accordingly, a negative going pulse is provided to the AND gate 407 via the lead 314 every 1,000 or 10,000 cycles of the input signal read by the read head 101, dependent upon the position of the switch 313. The negative going pulse is delivered to the latch inputs of the numeric displays 401 through 404 via the leads 411 and 409. The pulse remains low for a sufficient period of time that the counter circuitry of the display circuit 108 is cleared and a zero count is transferred into the register circuitry of the display circuit 108. Thus, the register circuitry of the display circuit 108 is cleared every 1,000 or 10,000 cycles such that the maximum skew measured is the maximum skew over the selected number of cycles of the input signal read by the read head 101. This periodic clearing of the maximum skew measurement prevents a single erroneous count from destroying the utility of maximum skew measurements. The largest count encountered during the selected number of cycles ends up in the register circuitry of the display circuit 108 and is displayed by the digital display circuitry of the display circuit 108. The negative going output of the monopulser 219 serves to clear the pulse counter 106 and the counter circuitry of the display circuit 108 through the monopulsers 310 and 311 in preparation for the count of the next cycle of the signal from the read head 101.

Figure 5:
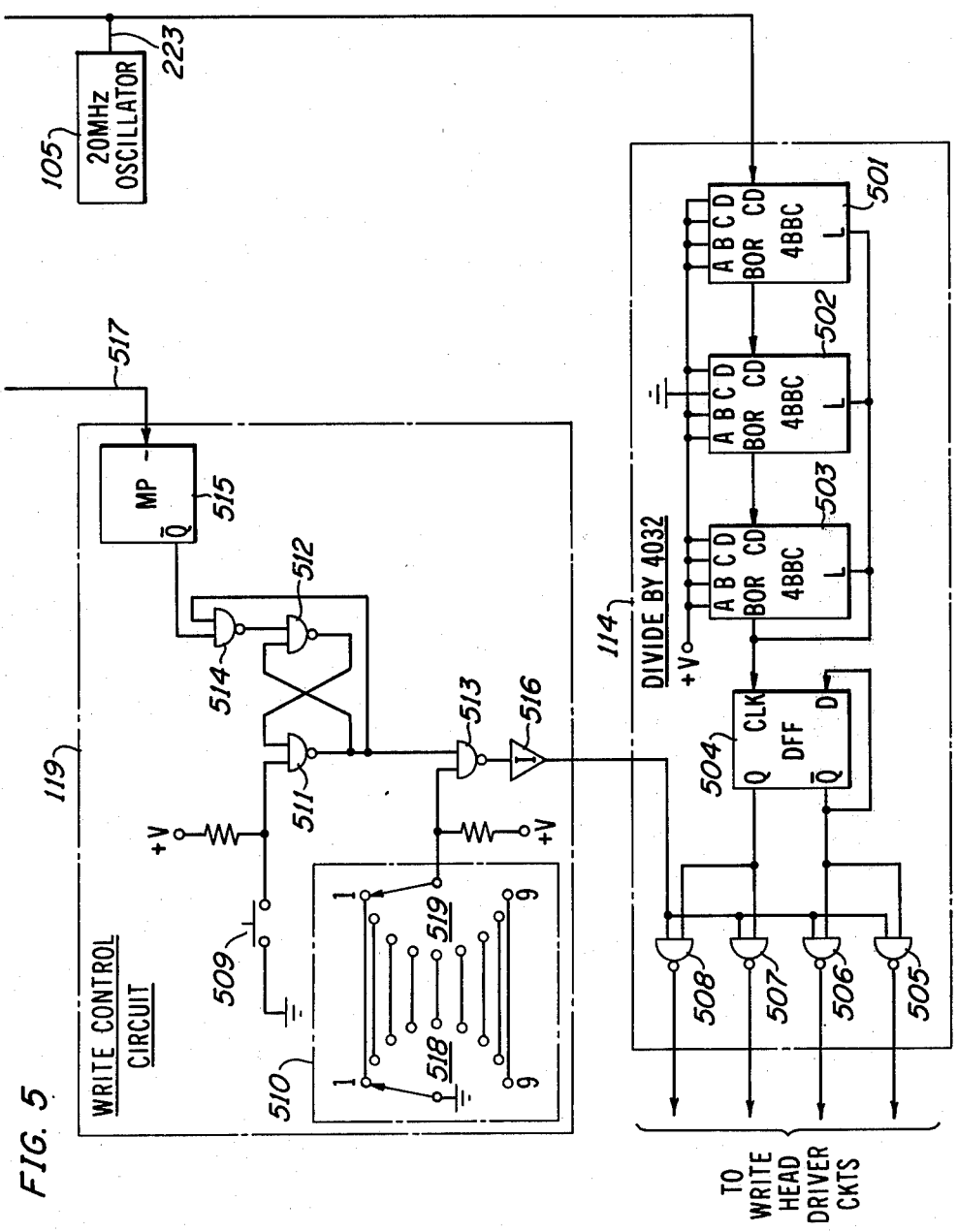
FIG. 5 is a schematic diagram of the divider circuit and write control circuit, both of FIG. 1.

FIG. 5 shows a schematic diagram of the divider circuit 114 and the write control circuit 119. The write head driver circuits 117 and 118 and the write head select switches 112 and 113 are well known in the art and will not be described. As previously described, for the measurement of write head skew the 20 Mhz signal from the 20 Mhz oscillator 105 is divided by the divider circuit 114 to provide a signal to the write head driver circuits 117 and 118. This signal is written onto two selected tracks of a magnetic tape by the write head 111 and read by the read head 101, which must be properly aligned. The numbers displayed on the display circuit 108 are indicative of the skew of the write head 111 in microseconds and tenths of microseconds.

The divider circuit 114 comprises commercially available four-bit binary counters 501 through 503. The four-bit binary counters 501 through 503 are counted down by pulses provided to their count down (CD) leads. A transition of the contents of a counter from 0 to 15 produces a negative going pulse on the borrow (BOR) lead, which pulse is equal in width to the input pulse which caused the transition. The latch (L) leads of the four-bit binary counters 501 through 503 provide for presetting the contents of the counters to a number which is determined by the voltage levels which are connected to the A, B, C, D leads. The A, B, C, D leads respectively correspond to the lowest order binary bit to the highest order binary bit of a four-bit binary number with ground being a "0" and a positive voltage being a "1". As the borrow lead of the four-bit binary counter 503 goes low, the four-bit binary counters 501 through 503 are preset to a number equivalent to 4,031. Thus, for each 4,032 pulses (pulse number 4,032 being required to reset the counters) provided by the 20 Mhz oscillator 105 to the four-bit binary counter 501, a single output pulse is delivered to the clock lead of the D flip-flop 504, providing a division of the 20 Mhz signal by 4,032.

The D flip-flop 504 is utilized to provide a more clearly square signal having complementary Q and $\bar{Q}$ outputs which are required by the write head driver circuits 117 and 118. The outputs of the D flip-flop 504 are connected to the inputs of the NAND gates 505 through 508.

The write control circuit 119 provides control over the write circuitry 120 via the write enable switch 509 and the write inhibit arrangement 510. If the write enable switch 509, which is a momentary make switch, is activated, the signal on the output of the NAND gate 511 will be forced high. If the write head driver circuits 117 and 118 are connected to two different gaps of the write head 111, the signals on the inputs of the NAND gate 513 will both be high and the signal on its output will be low forcing a high signal on the output of the inverter 516 and accordingly enabling the NAND gates 505 through 508. If the recording system is functioning properly and a signal is being written onto a tape by the write head 111 and read from the tape by the read head 101, pulses will appear at the output of the NAND gate 214 as previously described. The pulses at the output of the NAND gate 214 are provided to the input of the monopulser 515 via the lead 517. The monopulser 515 is a retriggerable monopulser whose output pulse is several times longer than the period of the signal written onto the tape by the write head 111 such that its $\overline{Q}$ output will remain low as long as pulses continue to be provided by the NAND gate 214. A low signal on the $\overline{Q}$ output of the monopulser 515 forces the output signal of the NAND gate 514 to be high, which together with the high output signal of the NAND gate 511 forces the output signal of the NAND gate 512 to be low. The low output signal from the NAND gate 512 stablizes the flip-flop comprised of the NAND gates 511 and 512 such that the write enable switch 509 can be released and the circuit will remain in the record mode. If the pulses from the NAND gate 214 should stop for any reason, e.g., improper recording or a stop of the tape motion, the signal on the $\overline{Q}$ output of the monopulser 515 will go high forcing the output signal of the NAND gate 514 to go low changing the state of the flip-flop comprising the NAND gates 511 and 512 and removing the circuit from the record mode. Thus, the operator must take positive action to place the test set into the record mode, and this action must be repeated whenever the tape in the recording system is stopped. This positive action requirement makes the operator more aware that the record mode is active. Since several iterations of the alignment of the write head and the read head may be necessary if the write head and the read head are not physically independent of one and another, operator awareness of the record mode activity is desirable to prevent writing onto the prerecorded skew alignment tape.

The write inhibit arrangement 510 comprises one pole of each of the write head select switches 112 and 113. These poles of the write head select switches 112 and 113 are interconnected such that if each switch is connected to the same gap of the write head 111, a ground will be connected to an input of the NAND gate 513. A low signal connected to the input of the NAND gate 513 forces its output high, which forces the output of the inverter 516 low, inhibiting the NAND gates 505 through 508. The write inhibit arrangement 510 is provided to prevent the write head driver circuits 117 and 118 from driving the same gap of the write head 111. If both write head driver circuits 117 and 118 are allowed to drive the same gap of the write head 111, the gap could be damaged by the double write current.

What is claimed is:

1. Apparatus for measuring tape head skew in a multiple track magnetic tape recording system by measuring the elapsed time between the occurrence of corresponding peaks of substantially identical alternating output signals read from two tracks of a magnetic recording tape, comprising:
   first and second signal processor means for generating signals indicative of the level and signals indicative of the peaks of the output signals read from the two tracks;
   first and second means for selectively connecting said output signals read from any one of a plurality of tracks to said first and second signal processor means respectively;
   oscillator means for generating a signal comprising repetitive pulses having a repetition period which is short relative to an allowable skew period;
   counter means;
   means for gating said repetitive pulses to said counter means;
   means responsive to said signals from said first and second signal processor means for enabling said gating means during the time between the occurrence of corresponding peaks of said output signals; and
   means for displaying the contents of said counter means.

2. Apparatus in accordance with claim 1 further comprising means coordinated with said output signals for clearing said counter means.

3. Apparatus in accordance with claim 2 wherein said means for displaying comprises:
   a register circuit;
   means for transferring the contents of said counter means to said register circuit; and
   digital display circuitry.

4. Apparatus in accordance with claim 3 further comprising:
   means connected between said gating means and said counter means for dividing said repetitive pulse signals to provide an average count over a predetermined number of cycles of said output signals; and
   cycle counter means for counting said predetermined number of cycles and for controlling said transfer means.

5. Apparatus in accordance with claim 1 further comprising:
   first and second write head driver means;
   first and second means for selectively connecting said first and second driver means respectively to any one track of a multiple track write head of the magnetic tape recording system; and
   means for applying a periodic signal to said first and second driver means.

6. Apparatus in accordance with claim 5 wherein said means for applying a periodic signal to said first and second driver means comprises:
   means for driving said signal from said oscillator means to generate said periodic signal.

7. Apparatus for measuring maximum tape head skew in a multiple track magnetic tape recording system by continuously measuring the elapsed time between the occurrence of corresponding peaks of substantially identical output signals read from two tracks of a magnetic recording tape, comparing each measurement so made with the contents of a display register, and placing the larger of the two, in the display register comprising:
   first and second signal processor means for generating signals indicative of the level and signals indicative of the peaks of the output signals read from two tracks of a magnetic recording tape;
   first and second means for selectively connecting said output signals from any one of a plurality of tracks to said first and second signal processor means;
   oscillator means for generating a signal comprising repetitive pulses having a repetition period which is short relative to an allowable misalignment period;
   counter means;
   means for gating said repetitive pulses to said counter means;

means coordinated with said output signals for clearing said counter means;

means responsive to said signals from said first and second signal processor means for enabling said gating means during the time between the occurrence of corresponding peaks of said output signals;

register means;

means for comparing the contents of said counter means and said register means;

means for gating the contents of said counter means into said register means if the contents of said counter means is greater than or equal to the contents of said register means; and means for displaying the contents of said register means.

8. Apparatus in accordance with claim 7 further comprising:

first and second write head driver means;

first and second means for selectively connecting said first and second driver means respectively to any one track of a multiple track write head of the magnetic tape recording system; and means for applying periodic signals to said first and second driver means.

9. Apparatus for determining skew in a multiple track magnetic tape recording system by measuring the elapsed time between the occurrence of corresponding peaks of substantially identical alternating output signals read from two tracks of a magnetic recording tape, which peaks occur simultaneously if there is no skew, comprising:

first and second signal processor means for generating peak indicating signals and threshold indicating signals in response to the output signals read from two tracks of a magnetic recording tape;

first and second means for selectively connecting said output signals read from any one of a plurality of tracks to said first and second signal processor means respectively;

oscillator means for generating a repetitive pulse signal having a repetition period which is short relative to an allowable skew period;

counter means;

first means for gating said repetitive pulse signal to said counter means;

means for counting a predetermined number of cycles of said output signals and for generating a signal in response to reaching a count equal to said predetermined number of cycles;

register means;

means for displaying the contents of said register means;

means responsive to said signal generated by said cycle counting means for transferring at least a portion of the contents of said counter means to said register means and subsequently for clearing said counter means and said cycle counter means; and means responsive to said threshold indicating signals and to said peak indicating signals from said first and second signal processor means for enabling said first gating means during the time between corresponding peaks of said output signals.

10. Apparatus in accordance with claim 9 wherein said display means comprises a digital display circuit.

11. Apparatus in accordance with claim 9 further comprising:

first and second write head driver means;

first and second means for selectively connecting said first and second driver means respectively to any one track of a multiple track write head of the magnetic tape recording system; and means for controllably applying a periodic signal to said first and second driver means.

12. Apparatus in accordance with claim 11 wherein said means for controllably applying a periodic signal to said first and second driver means comprises:

means for dividing said repetitive pulse signal from said oscillator means to generate said periodic signal;

second means for gating said periodic signal to said first and second driver means; and means for controlling said second gating means.

13. Apparatus in accordance with claim 12 wherein said means for controlling said second gating means comprises:

means for enabling said second gating means;

means for inhibiting said second gating means; and means connected to said means for enabling said first gating means for maintaining said second gating means in an enabled state independent of said enabling means while said output signals are continuously received by said first and second signal processor means.

14. Apparatus in accordance with claim 12 wherein said means for controlling said second gating means comprises:

a first NAND gate having its output connected to a first input of a second NAND gate, a first input of a third NAND gate, and a first input of a fourth NAND gate;

said second NAND gate having its output connected to a first input of said first NAND gate;

said third NAND gate having its output connected to a second input of said second NAND gate;

said fourth NAND gate having its output connected to the input of an inverter which has its output connected to said second gating means;

a first resistor connected between a positive potential and a second input of said first NAND gate;

a second resistor connected between said positive potential and a second input of said fourth NAND gate;

a momentary make switch for connecting ground to said second input of said first NAND gate;

means for connecting ground to said second input of said fourth NAND gate if said first and second driver means are connected to the same track; and a monopulser having its input connected to said means for enabling said first gating means and its output connected to a second input of said third NAND gate.

15. The method of measuring read head skew in a multiple track magnetic tape recording system comprising repetitive performance of the following steps:

a. reading two tracks of a standard alignment tape having prerecorded synchronous signals on at least two tracks thereof;

b. generating signals indicative of the peaks of corresponding portions of said prerecorded synchronous signals read from said two tracks;

c. generating an enable signal in response to the first to arrive of said peak indicative signals;

d. generating a disable signal in response to the later to arrive of said peak indicative signals;

e. counting pulses from a high frequency pulse source during the time period between the occurrence of said enable signal and said disable signal;

f. transferring the count obtained from step (e) to a register circuit; and g. displaying the contents of said register circuit.

16. The method in accordance with claim 15 further comprising the step of:

h. clearing the count obtained from step (e).

17. The method of measuring read head skew in a multiple track magnetic tape recording system comprising the following steps:

a. reading two tracks of a standard alignment tape having prerecorded synchronous signals on at least two tracks thereof;

b. generating signals indicative of the peaks of corresponding portions of said prerecorded synchronous signals;

c. processing said peak indicative signals into an enable signal corresponding to the first to arrive of said peaks and a disable signal corresponding to the later to arrive of said peaks;

d. generating a sequence of high frequency pulses;

e. counting said high frequency pulses during the time between said enable signal and said disable signal;

f. accumulating a count over a predetermined number of said peaks;

g. averaging said count over said predetermined number of said peaks;

h. transferring an average count to a register;

i. clearing the accumulated count; and j. displaying the contents of said register.

18. The method of measuring the write head alignment of a multiple track magnetic tape recording system comprising the following steps:

a. aligning a read head of the recording system;

b. writing a periodic signal onto at least two tracks of a magnetic recording tape;

c. reading said periodic signal with said read head;

d. generating signals indicative of the peaks of said periodic signal so read;

e. generating enable signals corresponding to the first to arrive of said peaks and disable signals corresponding to the later to arrive of said peaks in response to said peak indicative signals;

f. counting pulses from a high frequency pulse source during the time between said enable signals and said disable signals;

g. accumulating a count over a predetermined number of said peaks;

h. averaging said count over said predetermined number of said peaks;

i. transferring an average count to a register circuit;

j. clearing the accumulated count; and k. displaying the contents of said register circuit.

19. The method of claim 18 wherein the step of writing a magnetic recording tape comprises the following steps:

1. generating a high frequency signal;

2. dividing said high frequency signal to arrive at a predetermined frequency signal; and 3. providing said predetermined frequency signal to at least two write head driver circuits;

20. The method of measuring maximum tape head skew in a multiple track magnetic tape recording system comprising the following steps:

a. reading recorded signals from two tracks of a magnetic tape;

b. generating signals indicative of the peaks of corresponding portions of said recorded signals;

c. processing said peak indicative signals into an enable signal corresponding to the first to arrive of said peaks and a disable signal corresponding to the later to arrive of said peaks;

d. counting pulses from a high frequency pulse source during the time period between the occurrence of said enable signal and said disable signal;

e. comparing a count with the contents of a register circuit;

f. transferring said count into said register circuit if said count is greater than or equal to the contents of said register circuit;

g. clearing said count after the comparing and transferring steps are accomplished;

h. clearing said register circuit periodically after a predetermined number of counting time periods; and i. displaying the contents of said register circuit.

* * * * *